US007293925B1

(12) United States Patent
Sanseviero

(10) Patent No.: US 7,293,925 B1
(45) Date of Patent: Nov. 13, 2007

(54) DEVICE FOR MARKING UPON A SURFACE

(75) Inventor: Nicolas Sanseviero, Weston, FL (US)

(73) Assignee: CCN World, LLC, Weston, FL (US)

(*) Notice: Subject to any disclaimer, the term of this patent is extended or adjusted under 35 U.S.C. 154(b) by 143 days.

(21) Appl. No.: 11/348,779

(22) Filed: Feb. 8, 2006

(51) Int. Cl.

| | |
|---|---|
| ***A46B 11/00*** | (2006.01) |
| ***B43K 23/00*** | (2006.01) |
| ***B43K 5/00*** | (2006.01) |
| ***B25H 7/00*** | (2006.01) |
| ***G01D 21/00*** | (2006.01) |

(52) U.S. Cl. .......................... 401/48; 401/98; 401/202; 33/613; 33/666

(58) Field of Classification Search .................. 401/48, 401/99, 115, 131, 202, 98; 33/577, 613, 33/644, 645, 666, 671
See application file for complete search history.

(56) References Cited

U.S. PATENT DOCUMENTS 5,477,620 A * 12/1995 Barnett ........................ 33/666
6,952,887 B2 * 10/2005 Muchnik ..................... 33/666
7,185,442 B2 * 3/2007 Grillo .......................... 33/613
7,234,245 B2 * 6/2007 Tatum ......................... 33/666

* cited by examiner

*Primary Examiner*—David J. Walczak
(74) *Attorney, Agent, or Firm*—Albert Bordas, P.A.

(57) ABSTRACT

A device for marking upon a surface including a body assembly made of a resilient material, a cover member, a base assembly and a bottom cover. The body assembly has an outer wall, a central opening an upper end and a bottom end. The base assembly includes a marker rigidly attached to the center of the upper surface and a bottom surface. The upper surface is fixedly secure upon the bottom end of the body assembly in a way that the marker is housed within central opening. The bottom cover protects bottom surface. Cover member protects the upper end and the opening of the body assembly and prevents the marker from drying when the device for marking is not in use.

7 Claims, 4 Drawing Sheets

DEVICE FOR MARKING UPON A SURFACE

BACKGROUND OF THE INVENTION

1. Field of the Invention

The present invention relates to a device for marking, and more particularly, to a device for marking upon a surface such as a wall.

2. Description of the Related Art

When hanging a frame for a painting or mirror, it is often necessary to make a mark upon a surface to position where a nail and/or wall anchor will be placed. Making an incorrect mark upon the surface may result in multiple holes being made into a wall, or may otherwise permanently stain the wall. There is a need for a device that marks upon a surface, that is accurate and easy to use, to hang frames for paintings, mirrors, and the like.

There are no devices for marking upon a surface to the best of applicant's knowledge that include a body assembly made of a soft resilient material with a central opening, and a base assembly with a marker rigidly attached to its center in a way that the marker is housed within the central opening.

SUMMARY OF THE INVENTION

A device for marking upon a surface, comprising a body assembly having first and second ends and a central opening extending therethrough. A base assembly has first and second surfaces and marker means. The marker means is rigidly attached to the first surface. The first surface is fixedly secured at the first end of the body assembly in a way that the marker means is housed within the central opening when the body assembly is in an uncompressed state. The second end and the second surface have means for adhesion. First cover means are removably attached to the second surface of the base assembly to cover the second surface, and second cover means are removably mounted to the second end to cover the second end and prevent the marker means from drying out. The instant invention further comprises means for marking upon a surface with the marker means, when the body assembly is in a compressed state, causing the marker means to protrudes from the second end and touch the surface.

In the preferred embodiment, the body assembly is made of a soft resilient material. The first cover means, the second cover means and the base assembly have cooperative shapes and dimensions according to the body assembly. The first cover means has a first tab member to facilitate a user to remove it when needed. The second cover means has a second tab member to facilitate the user to remove it when needed. In the preferred embodiment, the body assembly has a cylindrical shape.

It is therefore one of the main objects of the present invention to provide a device for marking upon a surface that permits a user to make a mark upon a surface.

It is another object of this invention to provide a device for marking upon a surface that is easy to manipulate and use.

It is another object of the present invention to provide a device for marking upon a surface that is reusable.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
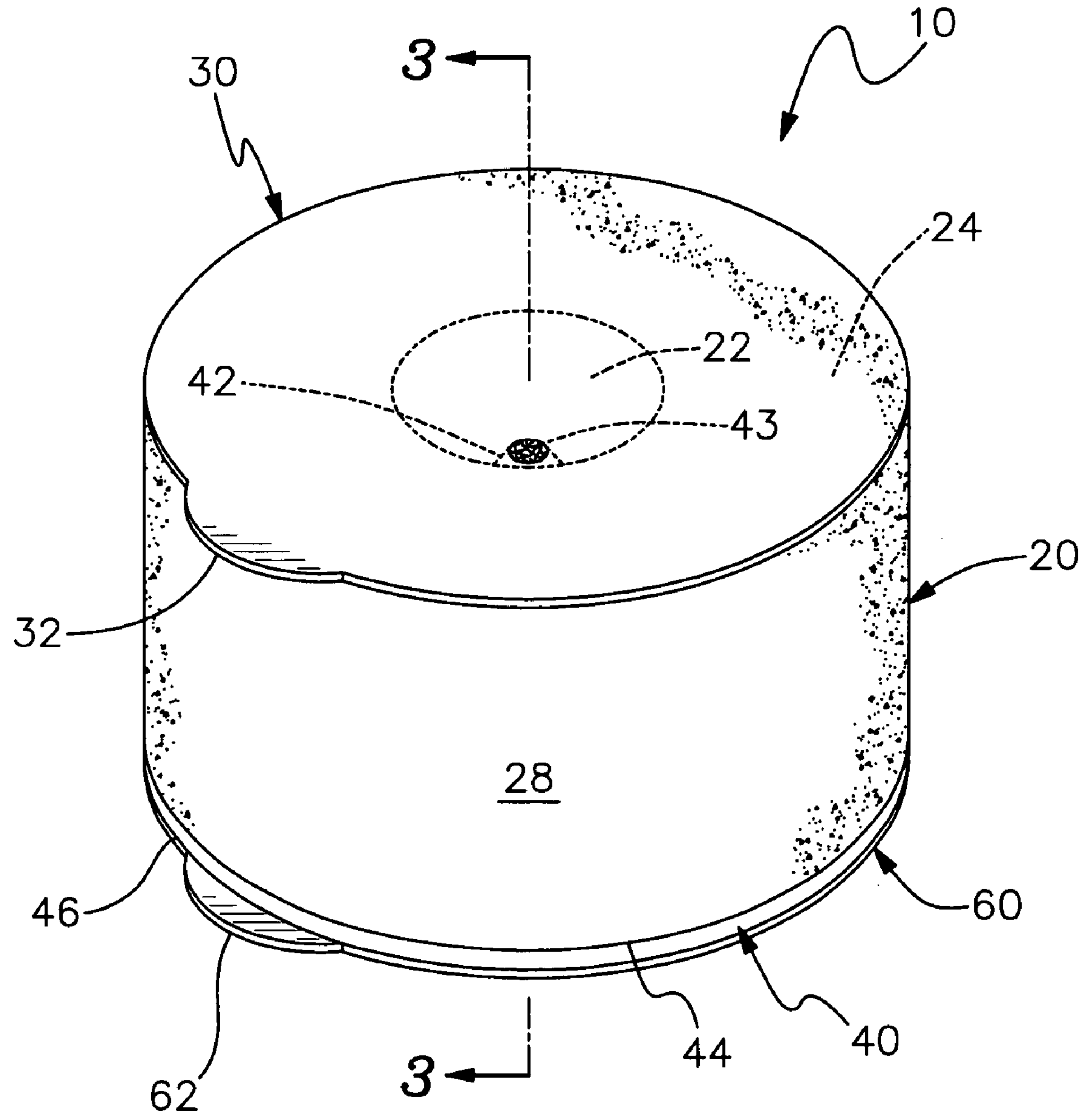
FIG. 1 represents an isometric view of the present invention.

Referring now to the drawings, where the present invention is defined as a device for marking upon a surface and is generally referred to with numeral 10, it can be observed that it basically includes body assembly 20, cover member 30, base assembly 40, and bottom cover member 60.

As seen in FIGS. 1; 2A; and 3, body assembly 20 is made of a soft resilient material, such as foam. In the preferred embodiment, body assembly 20 has a cylindrical shape and comprises central opening 22, upper end 24, and outer circular wall 28. Cover member 30 is removably mounted to upper end 24. Upper end 24 has adhesive properties. Cover member 30 protects upper end 24 and central opening 22 when device for marking 10 is not in use. Cover member 30 has tab member 32 to facilitate the user to remove it when needed. Furthermore, cover member 30 prevents marker 42 from drying out when instant invention 10 is not in use. Base assembly 40 has a cooperative shape and dimension to cover the bottom end of body assembly 20. Base assembly 40 comprises marker 42, upper surface 44, and bottom surface 46. Marker 42 has end 43 and is rigidly attached to the center of upper surface 44. Upper surface 44 is fixedly secure upon the bottom end of body assembly 20 in a way that marker 42 is housed within central opening 22. Bottom surface 46 has adhesive properties. Bottom cover member 60 is removably attached to bottom surface 46. Bottom cover member 60 protects bottom surface 46 when instant invention 10 is not in use. Bottom cover member 60 has tab member 62 to facilitate a user to remove it when desired. It is noted that the adhesive properties defined above may be a light glue.

Figure 2A:
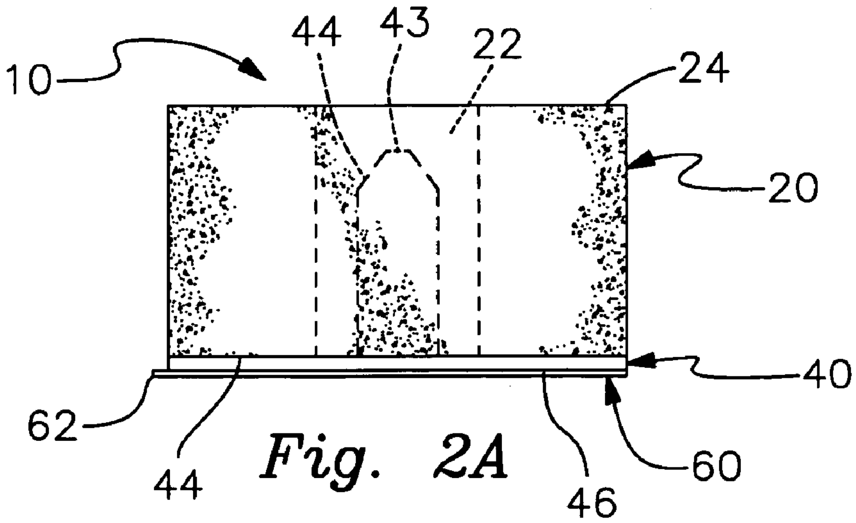
FIG. 2A shows a front elevational view of the present invention illustrating the body assembly in an uncompressed state.
Figure 2B:
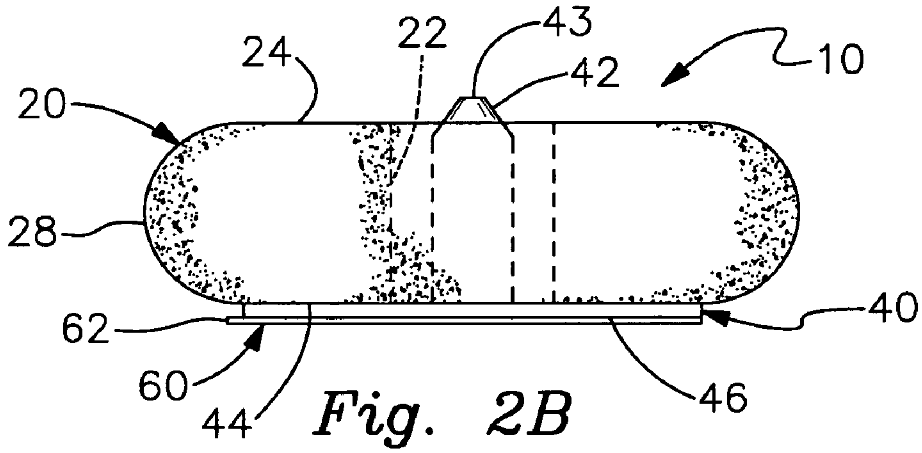
FIG. 2B illustrates a front elevational view of the present invention illustrating the body assembly in a compressed state and the end of the marker protruding outwardly from the central opening.
Figure 3:
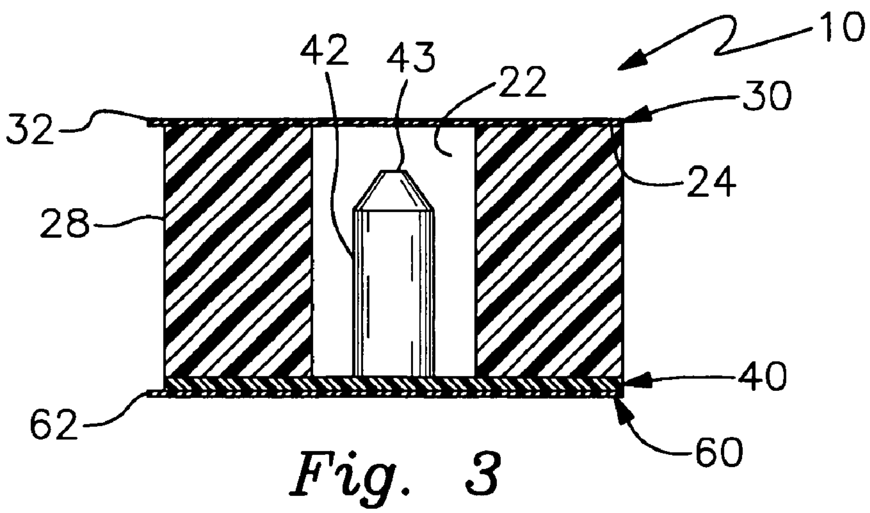
FIG. 3 is a cross-section view taken along line 3-3 as seen in FIG. 1 and showing the disposition of the marker inside the central opening of the body assembly when the body assembly in an uncompressed state.

As seen in FIG. 2B, instant invention 10, and specifically body assembly 20 is shown in a compressed position to illustrate how end 43 of marker 42 protrudes outwardly from central opening 22.

Figure 4:
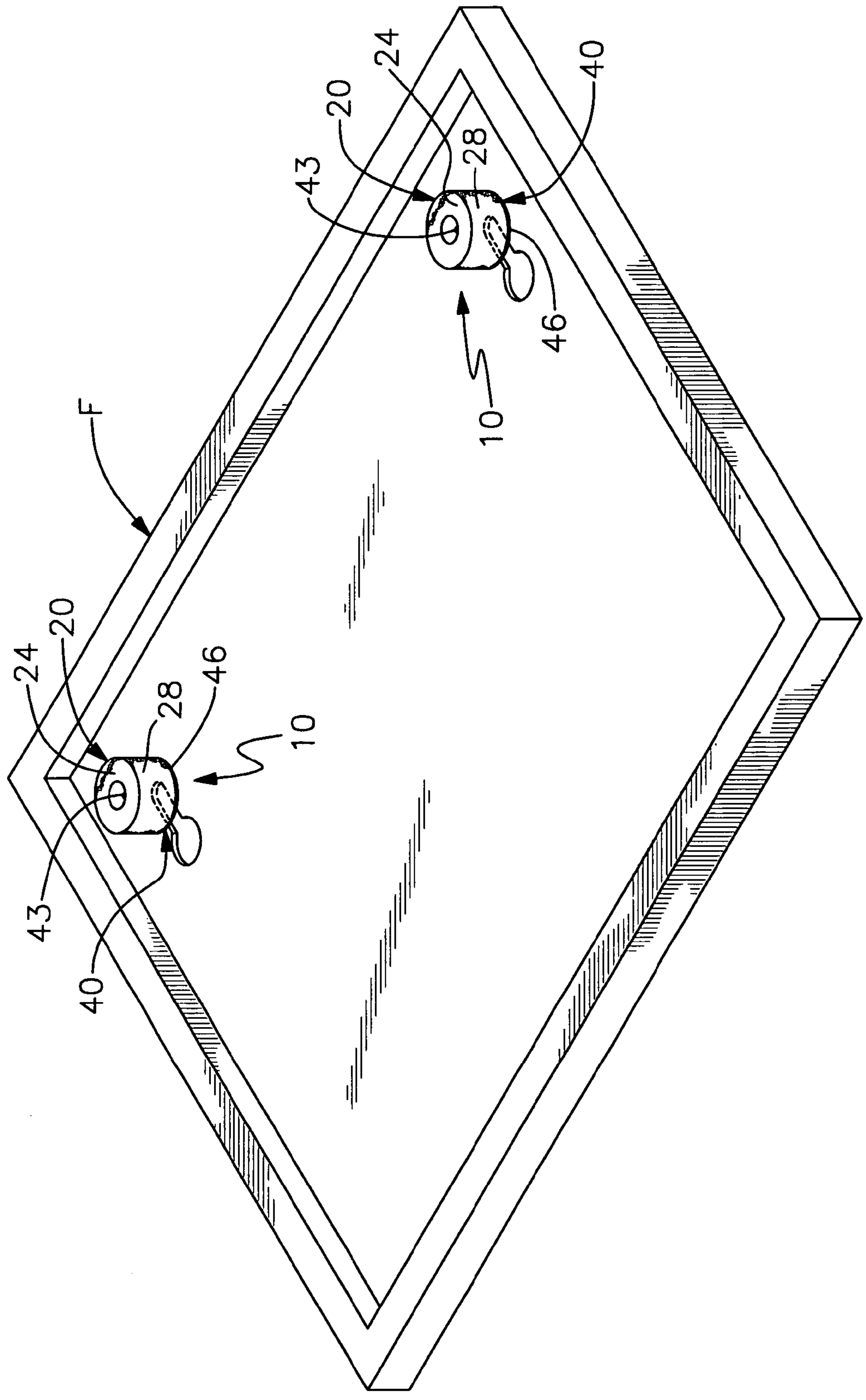
FIG. 4 is an isometric rear view of a frame assembly with two devices for marking upon a surface mounted thereon.

As seen in FIG. 4, to use instant invention 10 the user removes bottom cover member 60 and applies a force to bottom surface 46 against the rear side of a frame or object to be hung, such as frame F. The user then removes cover member 30 from upper end 24.

Figure 5A:
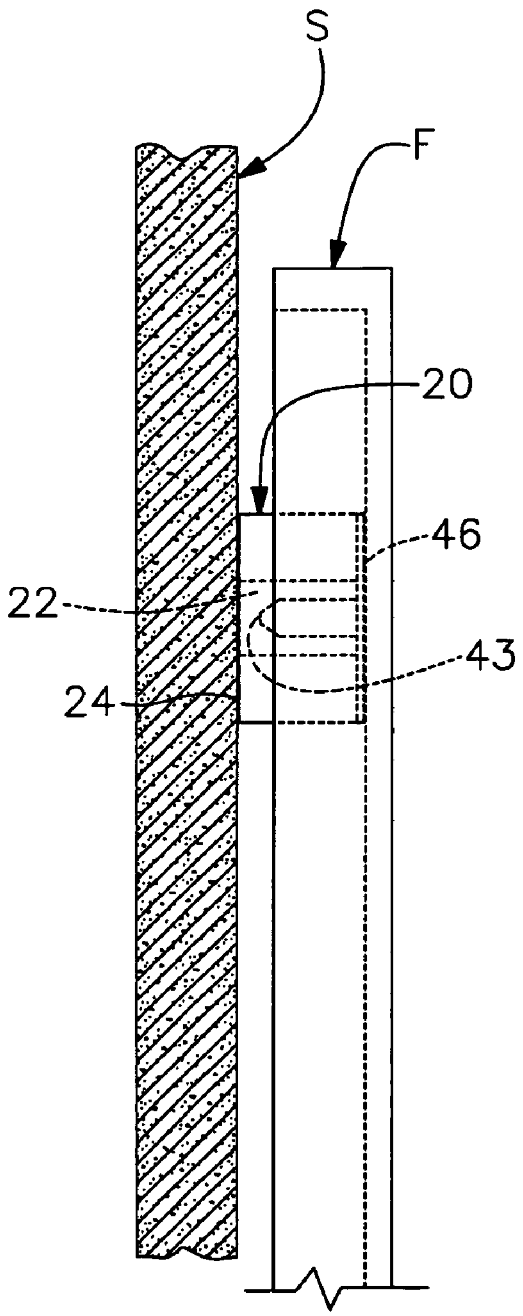
FIG. 5A is a front elevational view of the frame assembly represented in FIG. 4, positioned onto a surface.

As seen in FIG. 5A, the user then positions frame F, having instant invention 10 mounted thereon, onto a wall or surface S.

Figure 5B:
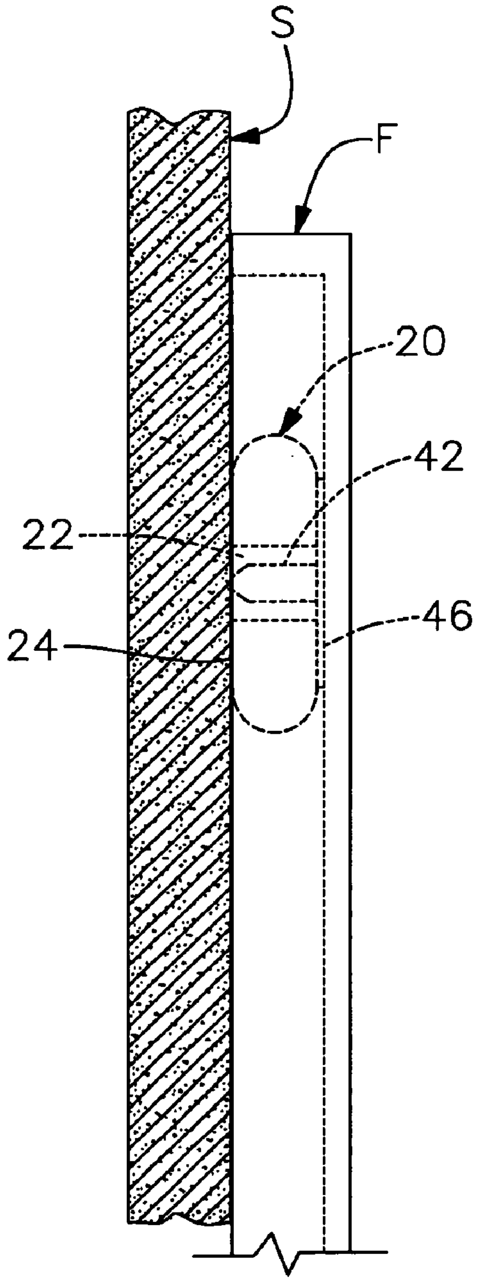
FIG. 5B is a front elevational view of the frame assembly represented in FIG. 5A, when the body assembly is compressed and the end of the marker marks upon the surface.

As seen in FIG. 5B, the user applies a force, not seen, upon frame F, causing body assembly 20 to compress and end 43 of marker 42 to make a mark upon surface S. Once the desired marks are made upon surface S, the user sets down frame F. The user may now nail in nails or drill surface S for wall anchors for screws. Once the means for hanging frame F are secured upon surface S, the user removes instant invention 10 from frame F, and frame F is hung on the means for hanging. Instant invention 10 may be reused for multiple uses. Cover member 30 may be replaced upon upper end 24 to help preserve marker 42. Cover 60 may be replaced too.

In other embodiments of the present invention, body assembly 20 may be of a variety of shapes, including but not limited to, oval, square, pentagonal, and hexagonal. Accordingly, cover member 30, base assembly 40 and bottom cover member 60 should have cooperative shapes and dimensions to complement the shape of body assembly 20 for the purposes defined above.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device for marking upon a surface, comprising:

A) a body assembly having first and second ends and a central opening extending therethrough;

B) a base assembly having first and second surfaces and marker means, said marker means rigidly attached to said first surface, said first surface is fixedly secured at said first end of said body assembly in a way that said marker means is housed within said central opening when said body assembly is in an uncompressed state, said second end and said second surface have means for adhesion;

C) first cover means removably attached to said second surface of said base assembly to cover said second surface; and D) second cover means removably mounted to said second end to cover said second end and prevent said marker means from drying out.

2. The device for marking upon a surface set forth in claim 1, further comprising means for marking upon a surface with said marker means when said body assembly is in a compressed state and said marker means protrudes from said second end and touches said surface.

3. The device for marking upon a surface set forth in claim 2, further characterized in that said body assembly is made of a soft resilient material.

4. The device for marking upon a surface set forth in claim 2, further characterized in that said first cover means, said second cover means and said base assembly have cooperative shapes and dimensions according to said body assembly.

5. The device for marking upon a surface set forth in claim 2, further characterized in that said first cover means has a first tab member to facilitate a user to remove it when needed.

6. The device for marking upon a surface set forth in claim 2, further characterized in that said second cover means has a second tab member to facilitate said user to remove it when needed.

7. The device for marking upon a surface set forth in claim 2, further characterized in that said body assembly has a cylindrical shape.

* * * * *